United States Patent [19]

Rindal et al.

[11] Patent Number: 4,710,666
[45] Date of Patent: Dec. 1, 1987

[54] HOMOPOLAR GENERATOR WITH VARIABLE PACKING FACTOR BRUSHES

[75] Inventors: Roald A. Rindal, Roseville; Bobby D. McKee, San Jose, both of Calif.

[73] Assignee: Westinghouse Electric Corp., Pittsburgh, Pa.

[21] Appl. No.: 912,737

[22] Filed: Sep. 29, 1986

[51] Int. Cl.⁴ .......................................... H02K 13/00
[52] U.S. Cl. .................... 310/248; 310/178; 310/219; 310/251; 428/929
[58] Field of Search ............... 310/178, 219, 239, 180, 310/248, 254, 249, 261, 251, 179, 252, 259, 253; 428/610, 607, 611, 929; 252/503, 512; 200/164 R

[56] References Cited

U.S. PATENT DOCUMENTS

| | | | |
|---|---|---|---|
| 648,892 | 5/1900 | Bachmann et al. | 252/512 |
| 656,652 | 8/1900 | Markey | 310/251 |
| 849,643 | 4/1907 | Speirs | 310/251 |
| 1,835,011 | 12/1931 | Burr | 310/248 |
| 2,252,277 | 8/1941 | Tate et al. | |
| 2,613,239 | 10/1952 | Lundy | |
| 3,114,062 | 12/1963 | Fay | |
| 3,590,300 | 6/1971 | Moberly | |
| 3,639,793 | 2/1972 | Appleton et al. | |
| 4,084,669 | 4/1978 | Suwa | 310/251 |
| 4,246,507 | 1/1981 | Weldon | 310/178 |
| 4,276,507 | 6/1981 | Stillwagon | 310/178 |
| 4,277,708 | 7/1981 | McNab et al. | |
| 4,314,172 | 2/1982 | Diepers | |
| 4,337,407 | 6/1982 | Hummert | |
| 4,358,699 | 11/1982 | Wilsdorf | |
| 4,415,635 | 11/1983 | Wilsdorf et al. | |
| 4,602,179 | 7/1986 | Kuznetsov et al. | 310/178 |

FOREIGN PATENT DOCUMENTS

| | | | |
|---|---|---|---|
| 0739900 | 8/1943 | Fed. Rep. of Germany | 310/251 |
| 0142504 | 11/1979 | Japan | 310/251 |

*Primary Examiner*—R. Skudy
*Attorney, Agent, or Firm*—R. P. Lenart

[57] ABSTRACT

A homopolar dynamoelectric machine is provided with a rotor having a central axis and being mounted for relative rotation with a stator structure that supports a field coil encircling the rotor and has a main pole piece for directing magnetic flux produced by current flowing in the field coil into a first section of the rotor. Brush assemblies which are capable of making sliding electrical contact with a current collection zone of the rotor extend longitudinally adjacent to that current collecting zone and include a plurality of contact elements. These contact elements are packed in an increasing density in a longitudinal direction from one end of the brush assembly to the other end. The use of a variable packing factor for the contact elements of the brush assembly results in more uniform heating of the rotor in the current collecting zone, thereby minimizing the peak rotor temperatures and permitting the machine to operate for longer time periods.

5 Claims, 5 Drawing Figures

HOMOPOLAR GENERATOR WITH VARIABLE PACKING FACTOR BRUSHES

STATEMENT OF GOVERNMENT INTEREST

The United States Government has rights in this invention pursuant to the terms of a purchase order No. R42CAA560943 issued under Contract No. F33615-84-C-2442.

BACKGROUND OF THE INVENTION

This invention relates to homopolar dynameolectric machines and more particularly to drum-type homopolar generators.

Homopolar generators have been successfully designed for providing short duration pulses having a peak current level in excess of a million amperes DC. Such generators generally include a cylindrical rotor of either a drum or disc configuration, mounted on a frame and rotated about a central axis. A field coil encircling the rotor and connected to an external current supply provides an applied magnetic field excitation passing through the rotor. The applied field excitation is usually confined and directed by a ferromagnetic stator structure surrounding the field coil and all, or a portion of, the rotor. When the rotor is spinning, free electrons within the rotor experience an electromotive force resulting from their interaction with the applied magnetic field excitation. Brushes, positioned adjacent to a current collection zone on the rotor, are then lowered onto the spinning rotor to allow an electrical current to flow under the influence of the electromotive force through return conductors to an external circuit, and then back onto the rotor through additional brushes at a different location. During the discharge, the interaction of the discharge current in the applied field excitation creates a force which decelerates the rotor. It has been found, that extremely high current pulses may be obtained by using a relatively low power conventional prime mover or a conventional low voltage, low amperage power source to store initial energy in the rotor by gradually motoring the rotor up to the desired rotational speed.

Drum-type homopolar dynamoelectric machines include a stationary excitation system and a rotating drum composed of a combination of ferromagnetic and highly conductive materials such that a direct current output voltage is produced along the axial length of the drum. These machines incorporate a set of current collecting brushes at axially displaced locations along the rotor surface, which carry full load current. Homopolar dynamoelectric machines may operate as either a motor or generator and are particularly suited to transfer energy in short, high current pulses to a storage inductor and a final load consisting of a resistive-inductive system. The rotor of drum-type homopolar machines may include a cylindrical shell of a highly conductive, non-ferromagnetic material which generates and supports the full load current. This member is bonded or shrunk onto a ferromagnetic inner cylindrical core which serves as the main rotor body and is directly attached to a drive or input shaft. Both components of the rotor are, preferably, homogeneous materials without segmentation or any combination of axial or circumferential grooves. Since modern current collectors may operate at a current density of between 10 and 15 kiloamps per square inch, it is imperative that the rotor surface near the two axial ends be smooth since this zone is used exclusively for current collection with, for example, solid metal graphite or fiber brushes. The machine's internal electromotive force is confined to an axial zone along the center of the rotor between the two outer current collection zones.

The rotor surface speed of a drum rotor in a high performance homopolar generator may exceed 100 meters per second and the generated current may exceed 1,000,000 amperes. Under those conditions, a large amount of heat is generated at the brush/rotor interface. The surface of the rotor directly under the brushes is heated by friction and electric power dissipated in the brush contact resistance. In some homopolar generator designs, the friction and brush contact losses will be in excess of 1 megawatt, resulting in high rotor surface temperatures. A third source of heating is the resistive losses resulting from current traveling axially through the conductive rotor shell. The amount of heat produced by each heat generating source is a function of the rotor length from the center plane of a typical homopolar generator to the peripheral edges of the brush assemblies. In prior art homopolar generators which include brush assemblies having a uniform packing factor, the region just at the beginning of each brush box has the highest resistive heating plus friction heating. The rotor conductor bulk temperature will therefore be the highest in this region. This results in high thermal stresses and increased brush wear. Furthermore, if the machine rotor includes a conductive shell which was heat shrunk on, this region might experience total relief of the heat shrunk fit. Therefore, it is desirable to design a homopolar dynameolectric machine in which the peak rotor temperatures in the vicinity of the brush assemblies are minimized.

SUMMARY OF THE INVENTION

The present invention seeks to minimize peak rotor temperatures in the vicinity of the brush assemblies by employing variable packing factor brush assemblies. By varying the packing factor, the frictional heating and contact resistance heating can be minimized in the region of high axial resistive heating. An optimization of the brush packing factor may result in a relatively uniform rotor conductor bulk temperature distribution. This will lower the maximum rotor conductor bulk temperature and enable the generator to operate for a longer duration.

A homopolar dynamoelectric machine constructed in accordance with the present invention comprises a rotor having a central axis, an annular field coil encircling the rotor, and a stator structure supporting the field coil and having a main pole piece for directing magnetic flux produced by current flowing in the field coil, into a first section of the rotor. Means are provided for rotating the rotor with respect to the stator and a brush assembly which is capable of making sliding electrical contact with a second section of the rotor is positioned to extend longitudinally adjacent to that second rotor section. The brush assembly includes a plurality of contact elements which are packed with an increasing density in a longitudinal direction. This results in a varying packing factor along the brush box length and is used to control the rotor conductor bulk temperature distribution under the brush box.

DESCRIPTION OF THE PREFERRED EMBODIMENT

Figure 1:
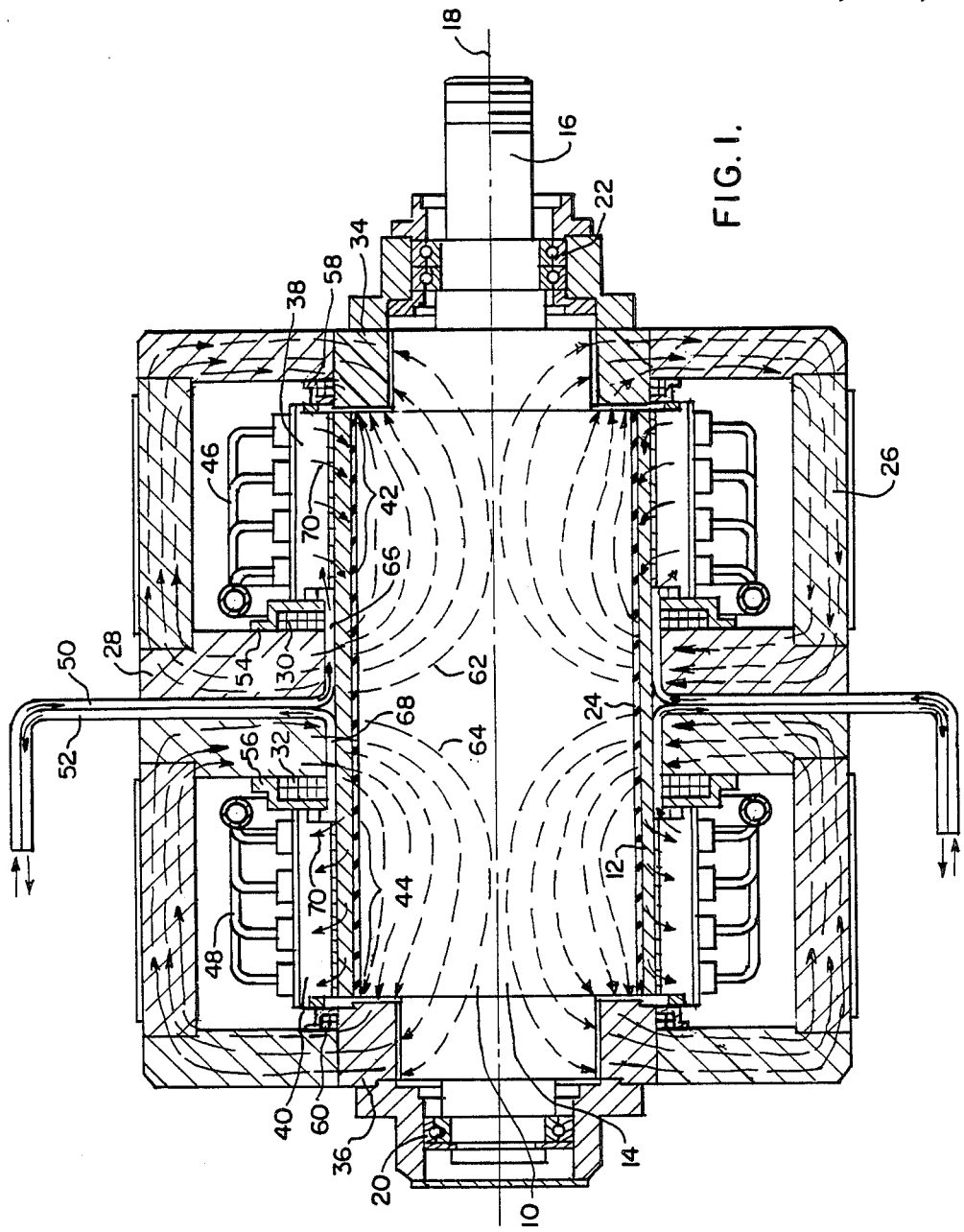
FIG. 1 is an axial cross-section of a homopolar dynamoelectric machine constructed in accordance with one embodiment of the present invention.

Referring to the drawings, FIG. 1 is an axial cross-section of a homopolar dynamoelectric machine constructed in accordance with one embodiment of the present invention. This machine includes a rotor 10 having a cylindrical shell 12 of a highly conductive, non-ferro-magnetic material which is bonded or shrunk onto a ferro-magnetic inner cylindrical core 14 that serves as the main rotor body and is directly attached to a drive or input shaft 16. The rotor is mounted for rotation about a central axis 18 by way of bearings 20 and 22. Insulation 24 is positioned between the shell 12 and the core 14. The stator structure 22 includes a main pole piece 28 which is positioned to direct magnetic flux produced by current flowing in excitation coils 30 and 32 radially into a central portion of the rotor. The stator 26 also includes end pole pieces 34 and 36 which are positioned adjacent to each end of the rotor to direct magnetic flux axially through the adjacent rotor ends.

A plurality of brush assemblies, which include assemblies 38 and 40, are spaced around the machine periphery adjacent to the rotor surface to minimize brush current density for a given total output current. Large homopolar machines may have in excess of 40 brush boxes per side, spaced at intervals of less than 10°. The brush assemblies are mounted to make sliding electrical contact with the current collection zones 42 and 44 of the rotor and may be disengaged from the rotor surface by conventional brush lifting mechanisms 46 and 48. Such mechanisms are usually pneumatically operated with all brush actuators connected in parallel to provide for simultaneous dropping or lowering of all brushes with equal pressure and response time. Insulated conductors 50 and 52 connect brush assemblies 38 and 40, respectively, to an external circuit. Magnetic flux shields 54 and 56 are positioned adjacent to field coils 30 and 32 to divert leakage flux from the main field poles of the machine into paths as close as possible to the main magnetic path, thereby minimizing electromagnetic interactions in the current collection zone.

The machine of FIG. 1 also includes auxiliary excitation coils 58 and 60 which serve to minimize radial components of magnetic flux in the current collection zones. The main flux paths 62 and 64 of this machine are seen to pass radially into the central portion of the rotor adjacent to the main pole piece 28 and to pass axially through the ends of the rotor into the stator end pole pieces 34 and 36. Conductors 50 and 52 are connected to brush assemblies 38 and 40 by way of cylindrical conductors 66 and 68 which extend between the main pole piece 28 and the rotor surface. As the rotor rotates, it cuts lines of flux in the main flux paths 62 and 64 thereby inducing current shown as solid arrows 70 in the conductive shell of the rotor. This current is transferred to a load circuit by conductors 50 and 52 when brush assemblies 38 and 40 are lowered to make sliding electrical contact with the current collection zones 42 and 44 of the rotor.

Figure 2:
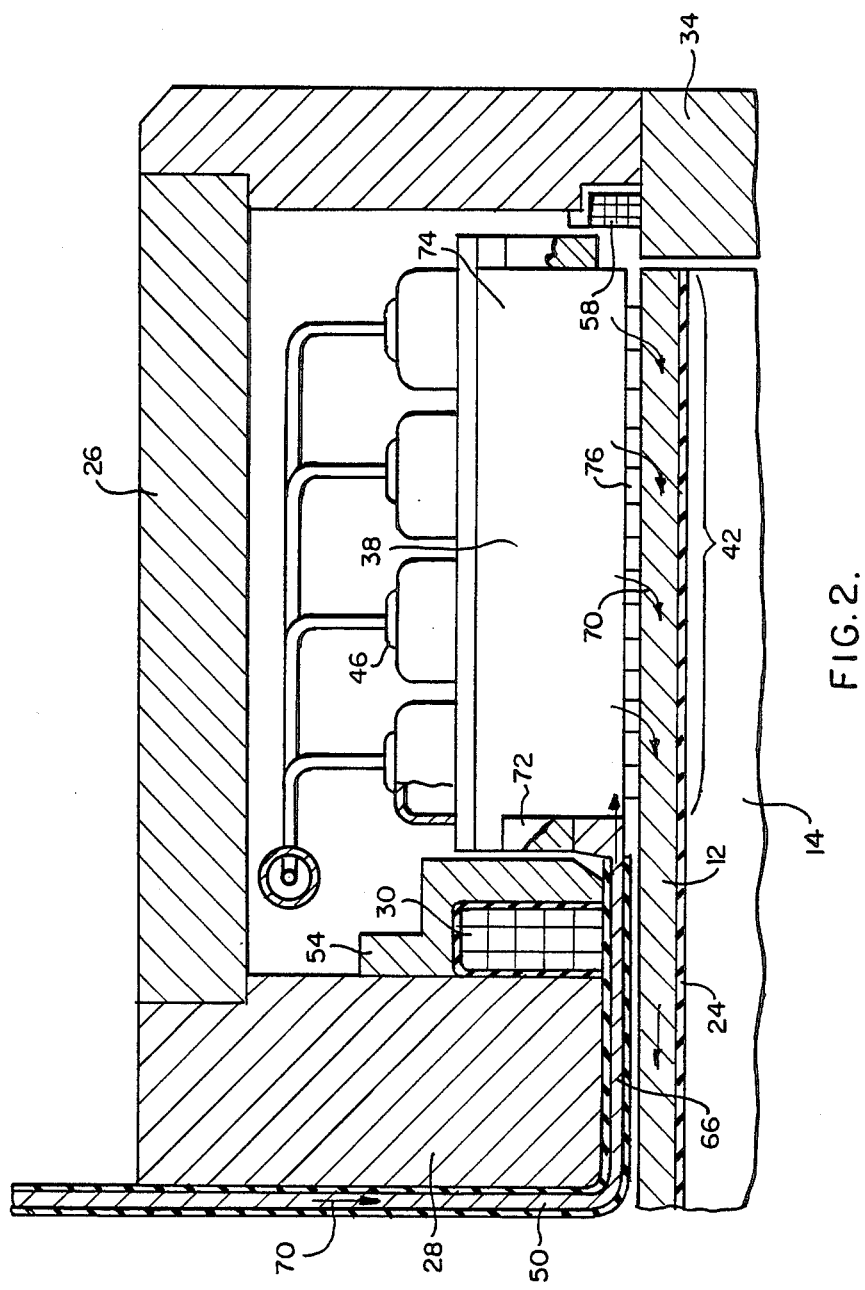
FIG. 2 is an enlarged cross-section of one current collection region in the machine of FIG. 1.

FIG. 2 is an enlarged cross-section of one current collecting region of the machine of FIG. 1. In this view, one end of brush assembly 38 can be seen to be electrically connected to a conductive ring 72 which extends around the rotor and connects all of the brush boxes adjacent to current collecting zone 42. Brush assembly 38 is shown to include a generally rectangular brush box 74 extending longitudinally adjacent to current collecting zone 42, and a plurality of contact members 76 extending from the brush box 74 and arranged with a variable packing factor such that the density of contact elements 76 increases in a longitudinal direction from the main pole piece side of the brush box to the end of the rotor.

Figure 3:
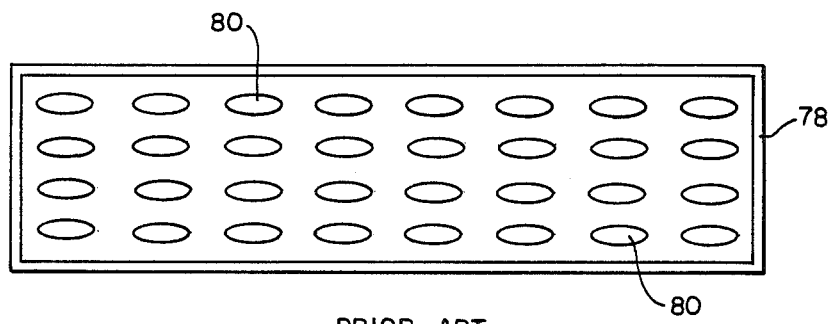
FIG. 3 is a schematic plan view of a prior art brush box assembly.

FIG. 3 is a schematic plan view of a prior art brush assembly having a generally cylindrical brush box 78 and a plurality of contact elements 80 which are uniformly distributed within the brush box. When such a brush assembly is lowered to make sliding contact with the rotor surface, it will result in relatively uniform frictional heating and contact resistance heating in the current collecting zone.

Figure 4:
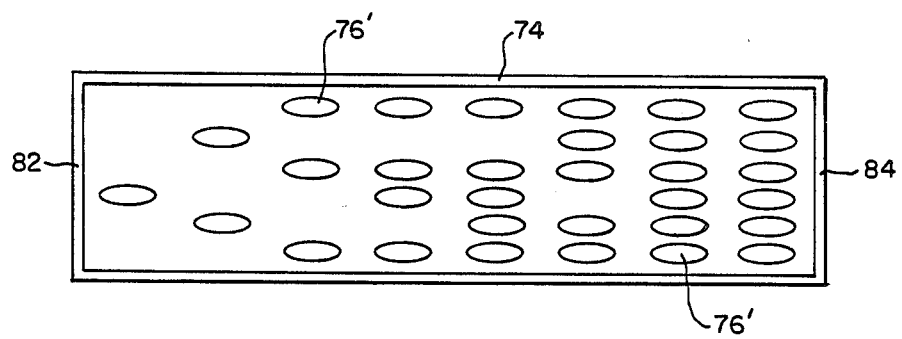
FIG. 4 is a schematic plan view of a brush box assembly constructed in accordance with one embodiment of the present invention.

FIG. 4 is a schematic plan view of a brush assembly constructed in accordance with one embodiment of the present invention. This brush assembly includes a generally cylindrical brush box 74 and a plurality of contact elements 76' which are arranged with an increasing packing factor in a longitudinal direction extending from the main pole piece end 82 of the brush box 74 to the other brush box end 84 which corresponds to the end of the rotor in the machine.

Figure 5:
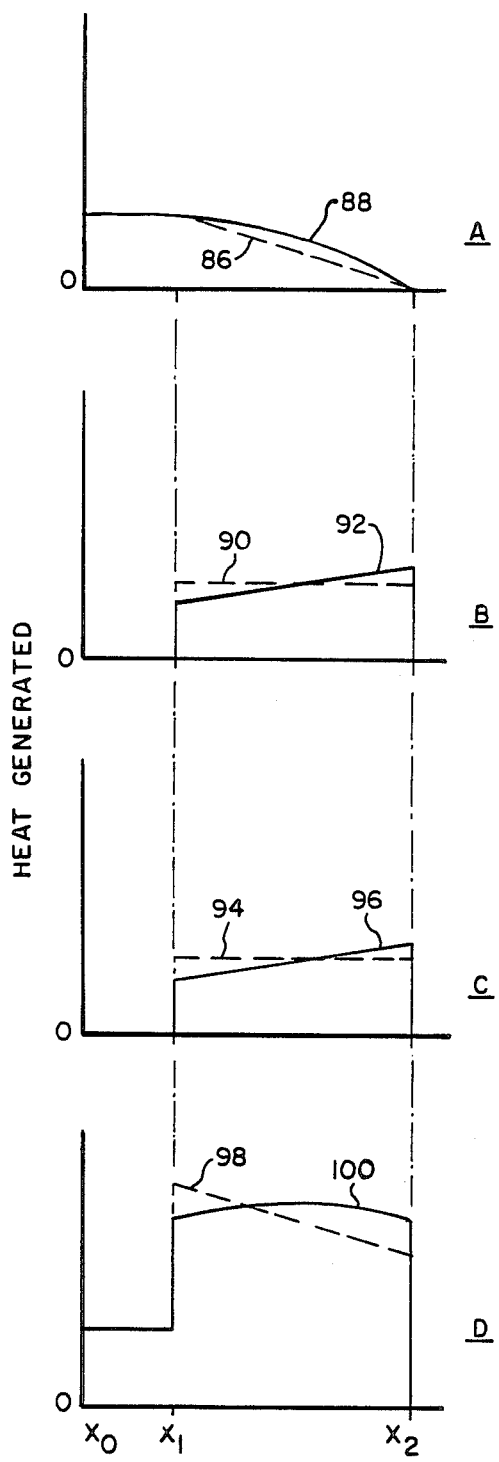
FIG. 5 is a series of diagrams which compare the heat generated in the rotors of prior art homopolar generators with the heat generated in the rotors of homopolar generators constructed in accordance with the present invention.

FIG. 5 is a series of curves which compare the heat generated in the machine rotor as a function of length for machines having both the prior art brush configuration of FIG. 3 and the present invention brush configuration of FIG. 4. Curve 86 represents the resistive heating due to losses as current travels axially through the rotor conductive shell from the center of the rotor designated as $X_0$, past the first end of the brush box designated as $X_1$, and to the second end of the brush box designated as $X_2$. Curve 88 represents the resistive heating due to losses as current travels axially through the rotor conductor when a variable packing factor brush assembly, similar to that of FIG. 4, is utilized. Curve 90 represents the heat generated due contact resistance with the prior art brush assembly while curve 92 represents the heat generated due to contact resistance with the brush assembly of the present invention. Curve 94 represents the heat generated due to friction with the prior art brush assembly while curve 96 represents the heat generated due to friction with the present invention brush assembly. The axial current flow resistive heating, contact resistance heating, and frictional heating add up to the total heating illustrated by curve 98 for prior art machines and curve 100 for the machines of the present invention. Note that the peak heating of curve 98 which occurs adjacent to location $X_1$ has been eliminated and that the maximum heating illustrated in curve 100 is less than the peak heating of curve 98.

It should be apparent to those skilled in the art that the use of a variable packing factor brush assembly can obtain a relatively uniform rotor conductor bulk temperature distribution in the current collection zones. This reduces the maximum heat generated adjacent to the main pole piece end of each brush box by reducing the contact resistance heating and frictional heating at that location. Although the present invention has been described in terms of what is at present believed to be its preferred embodiment, it will be apparent to those skilled in the art that various changes may be made without departing from the scope of the invention. It is therefore intended that the appended claims cover such changes.

What is claimed is:

1. A homopolar dynamoelectric machine comprising:
   a rotor having a central axis;
   an annular field coil encircling said rotor;
   a stator structure supporting said field coil for directing magnetic flux produced by current flowing in said field coil, into a first section of said rotor;
   means for rotating said rotor with respect to said stator;
   a brush assembly including a plurality of contact elements which are capable of making sliding electrical contact with a second section of said rotor and extending longitudinally adjacent to said second rotor section; and
   wherein said plurality of contact elements are packed with an increasing density in a longitudinal direction parallel to said central axis, such that the number of said contact elements capable of making sliding electrical contact with said rotor increases in said longitudinal direction.

2. A homopolar dynamoelectric machine as recited in claim 1, wherein said rotor comprises:
   a ferromagnetic core; and
   a conductive, non-ferromagnetic shell mounted on said core, 3. A homopolar dynamoelectric machine as recited in claim 1, wherein said stator structure includes:
   a magnetic flux path extending from a main pole piece to an end pole piece, said end pole piece being positioned adjacent to one end of said rotor and on an opposite side of said second rotor section from said main pole piece, to direct magnetic flux axially through the adjacent rotor end.

4. A homopolar dynamoelectric machine as recited in claim 1, further comprising:
   additional brush assemblies capable of making sliding electrical contact with said second rotor portion, wherein each additional brush assembly extends longitudinally adjacent to said second rotor section and includes a plurality of contact elements packed with an increasing density in a longitudinal direction parallel to said central axis; and
   all of said brush assemblies being electrically connected in parallel to a brush collector ring, wherein said brush collector ring extends arcuately around at least part of said rotor.

5. A homopolar dynamoelectric machine as recited in claim 1, wherein said brush assembly further includes:
   a generally rectangular brush box for supporting said contact elements.

* * * * *